United States Patent [19]
Treadwell

[11] 3,800,463
[45] Apr. 2, 1974

[54] SPRING TRAP SETTER
[76] Inventor: Leo E. Treadwell, R.F.D. No. 3, Box 378, Barrington, N.H. 03867
[22] Filed: May 4, 1972
[21] Appl. No.: 250,324

[52] U.S. Cl. .................................................. 43/97
[51] Int. Cl. ........................................ A01m 23/28
[58] Field of Search .......... 43/97; 417/234; 92/58.1; D23/16

[56] References Cited
UNITED STATES PATENTS
D28,899   6/1898   Smith .................................. D23/16
3,462,872  8/1969   Hall et al. ............................. 43/97
FOREIGN PATENTS OR APPLICATIONS
139,621  12/1950   Australia ................................ 43/97

Primary Examiner—Robert Peshock
Assistant Examiner—Daniel J. Leach
Attorney, Agent, or Firm—Clarence O'Brien; Harvey B. Jacobson

[57] ABSTRACT

A trap setter which lends itself to safe setting use when properly attached to a Conibear multiple jaw animal trap equipped, at either one or both ends, with spring-biased V-shaped jaw closing units. This setter, broadly construed, resembles a bicycle tire pump. It embodies a cylinder positioned and held by a base or foot piece and has a T-shaped manually controlled plunger rod and upper and lower coordinating hooks. The bill portions of the hooks are releasably hitched to terminal eyes on the free ends of the usual spring-biased arms on said V-units and which are forcibly drawn and safely linked together by a pivoted arm latching hook. By compressing and latching both units, the then inactive jaws allow the trigger means to be attached in an acceptably safe manner.

1 Claim, 3 Drawing Figures

PATENTED APR 2 1974 3,800,463

Trap Set

SPRING TRAP SETTER

This invention relates to certain new and useful improvements in a portable self-contained safe-to-use trap setter which is expressly designed and structurally adapted for compressing and reliably latching the V-shaped spring-biased unit, at either or both ends, of a Conibear animal trap, and which enables the opposed sets of jaws to be forced toward each other and securely held until the usual trap trigger has been safely applied and set for use.

For background purposes it is significant to point out at the outset that Conibear animal actuated traps characterized by opposed sets of jaws which are moved toward each other and held in such position until the trap trigger has been set are old and well known. One prior art example is disclosed in U.S. Pat. No. 3,010,245 granted to Frank R. Conibear and which reveals a trap with a single spring unit device at one end and shows one type of trigger which is used by trappers. There are instances wherein duplicate spring-biased actuating springs are installed at the respective ends of the opposed jaws as shown for example in the John O. Harrison U.S. Pat. No. 3,411,234 and which has to do primarily with a safety device to assist in setting the jaws.

An object of the present invention is to improve upon prior art Conibear trap structures and more particularly to provide an improved self-contained readily applicable and removable device for setting the trap and which features certain safety contrivances.

Briefly the concept pertains to an improved self-contained readily attachable and detachable arm compressing spring unit setter for the type of spring unit which is used at either one or both ends of a multiple jaw animal actuated Conibear trap. It is characterized by foot held base means, positioning means secured at a lower end to and rising perpendicularly from said base means, manually actuatable means operatively mounted on said first-named means and having complemental means which is releasably engageable with the eyes provided at the free ends of the divergent spring-biased arms of the V-shaped jaw closing unit in a manner to forcibly spring and move said eyes toward and from each other in keeping with the safe setting results desired.

Stated somewhat more explicitly the base comprises a rigid plate which is fashioned into a foot piece. The positioning and setting means carried by the base comprises a vertically elongated cylinder and the manually actuated means comprises a plunger rod and associated aligned and coacting hooks for releasable engagement with the aforementioned eyes.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 3:
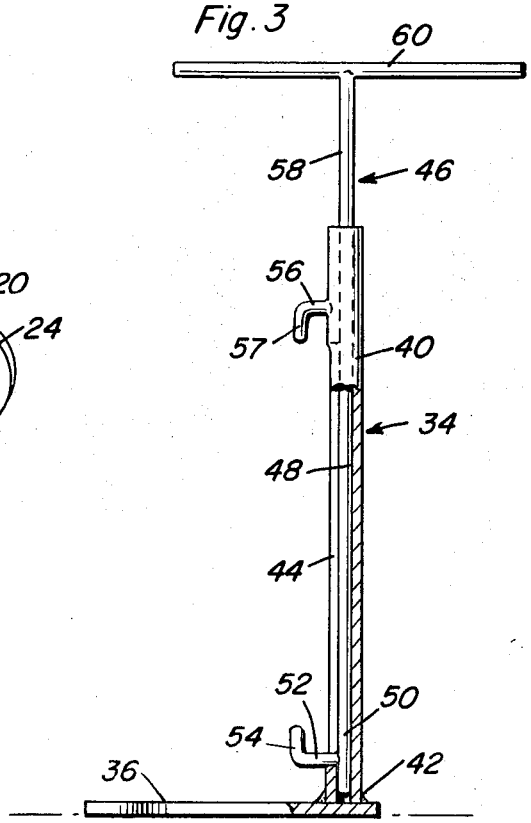

And FIG. 3 is a view with parts in section and elevation and wherein all of the component parts of the device or setter are shown and readied for use.

By way of introduction it is to be pointed out that the trap setter herein revealed has been found to be successful for use on Conibear traps identified in the trade as No. 110 — No. 120 — No. 220 and 330.

Figure 1:
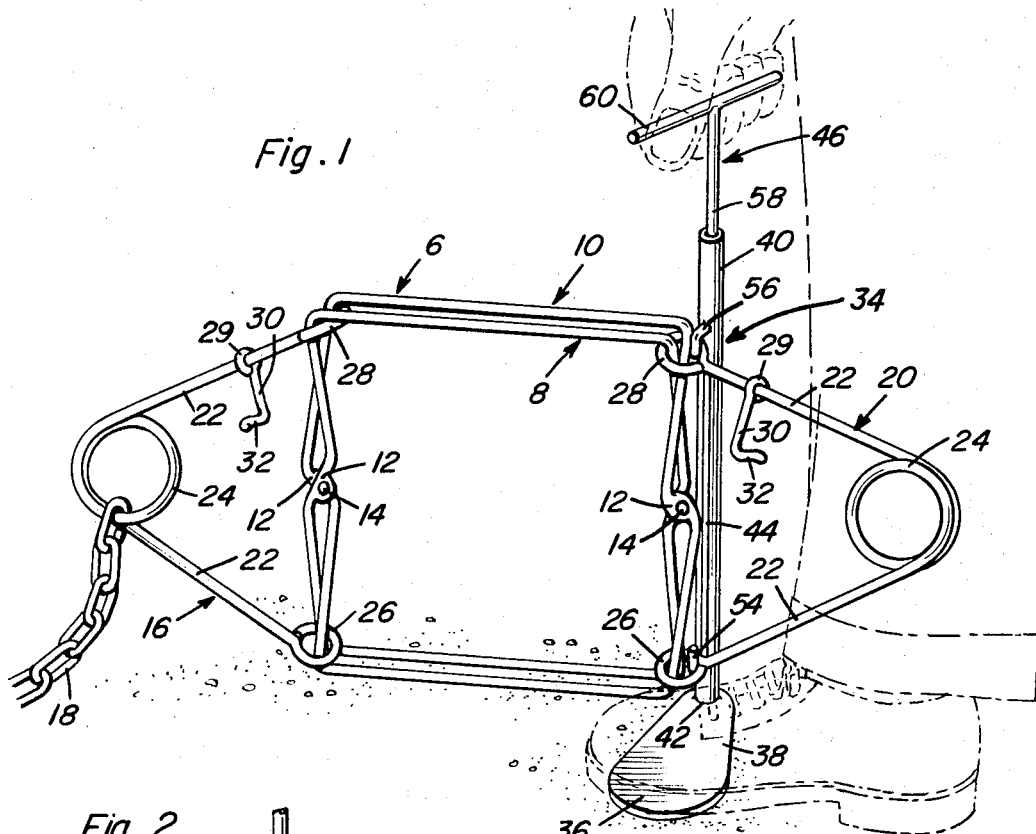
FIG. 1 is a view showing one of the aforementioned Conibear traps with the jaws in normal or ready-to-set position and showing the V-shaped jaw closing spring units at the respective ends and showing, which is more significant, the improved detachable self-contained spring unit setter and how it is constructed and readied for use.

The Conibear trap, construed as a structural entity, is denoted in FIG. 1 by the numeral 6. One double jaw frame unit of the trap is denoted at 8 and the companion unit at 10. As previously stated, the trap shown may be said to be of a conventional type in that the laterally directed cooperating arms of the jaws have flattened portions 12 which are overlapped and pivotally connected together at 14. This appears at the right and also at the left in FIG. 1. One V-shaped jaw closing spring unit is denoted at the left as at 16 and provided with an anchoring chain 18. The other substantially duplicate V-shaped jaw closing spring unit, the one at the right, is denoted by the numeral 20 and corresponds with the unit 16. Both units comprise normally spring-biased diverging arms or legs 22 having converging ends joined by coil spring means 24. The inward ends of the arms are provided with customary integral eyes the lower one of which is denoted at 26 and the upper one at 28. These eyes are of customary construction and slidingly embrace the pivoted arms of the jaw frames. At least one arm is provided with a latching hook having an eye 29 and a leg portion 30 carrying a hook 32 which when not in use is free as illustrated in FIG. 1 and which when in use is latched to hold the arms 22 together as brought out in FIG. 2.

The essence of the present invention has to do with the self-contained readily attachable and detachable as well as ready-to-use portable spring unit and trap setter. This device is denoted in its detached form in FIG. 3 by the numeral 34. Broadly it comprises foot means at the bottom, hand actuated handle-equipped means at the top, means in-between for adjoining the top and bottom means or members and more particularly the specific embodiments of these component parts. The first means comprises a base plate 36 which is substantially ovate in shape as perhaps best shown in FIGS. 1 and 2, this being provided at the narrowing rounded end 38 with a standard or upright. More specifically the upright comprises a tube or cylinder 40 of requisite diameter and height and whose lower end 42 is integrally united with the end portion 38. It will be noted that in one side the tube or cylinder is provided with a keying slot 44. The plunger or rod means, a significant component, is denoted by the numeral 46 and comprises a rigid rod 48 of a length that the major portion, when not in use, extends axially and telescopically into the bore of the cylinder. It will be noted that the lower end of the slot 44 terminates just above the plane of the base and that the coacting portion 50 is provided with a substantially L-shaped hook 52 whose bill portion is denoted at 54. This hook is detachably connectible with the adjacent eye 26 in the manner illustrated in FIGS. 1 and 2. This may be said to be the relatively shiftable or movable hook and the hook proper or shank is keyed or sliding in the slot 44. In fact the bill portion extends outwardly beyond the slot to achieve the result desired. The slot and hook are in alignment with the relatively stationary L-shaped hook 56 which is integrally joined with the upper end portion of the barrel or cylinder and whose bill portion is denoted at 57 and is arranged for releasable engagement with the eye 28 in the manner best illustrated in FIGS. 1 and 2.

The upper portion of the plunger or rod, that is the portion 58 is provided with handle means, preferably a crosshead 60. Thus the rod as a unit is T-shaped and is constructed and positioned for use as clearly shown in FIGS. 1 and 3.

In use, by placing one's foot on the foot piece or plate 36 in the manner shown in phantom lines in FIG. 1 and then by engaging the bill portions 54 and 58 with respectively associated eyes 26 and 28 the user is ready to catch hold of the handle means and to lift upwardly thereon also as suggested in phantom lines. As the shank 52 of hook 54 rides up in the keying slot 44 the spring-biased arms 22 of the unit 20 are squeezed or drawn together as permitted by the coil spring 24. When the eyes 26 and 28 occupy the positions shown in FIG. 2 the jaws are set whereupon the hook 32 is latched in place over the two arms 22 to hold the unit in the set position.

Figure 2:
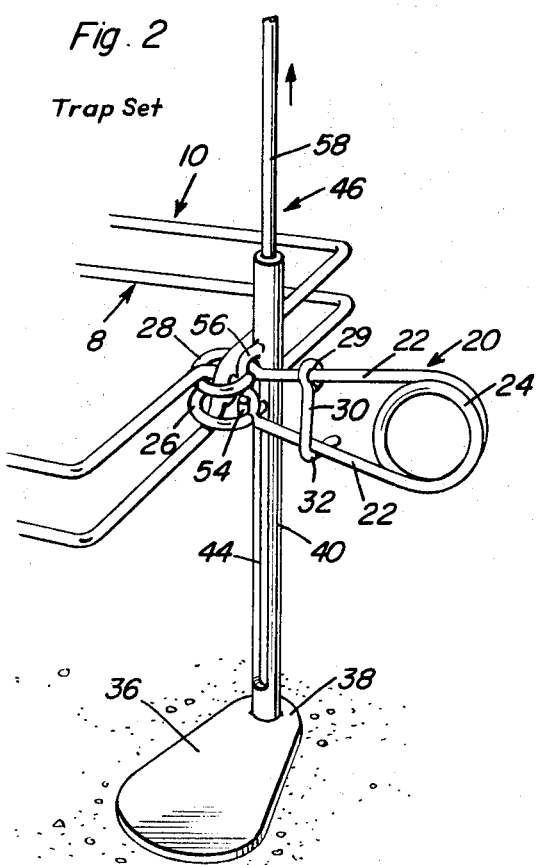
FIG. 2 is a fragmentary perspective view with the jaws set and with the rod or handle means of the setter in its elevated position and with both hooks engaged with the respectively cooperable eyes at the ends of the V-shaped jaw closing spring unit and also with the arms of said unit latched together by an existing type catch or hook.

Once the jaws of the trap are set as suggested in FIG. 2 the user can apply the trigger means (not shown) and the thus readied trap can be brought into use in one of many varying situations depending on the job at hand.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use on and in association with a Conibear multiple jaw animal actuated trap having at least one V-shaped jaw closing spring unit, said unit having normally divergent spring-biased arms provided at free ends with slidable jaw encircling eyes: an improved readily attachable and detachable self-contained arm compressing spring unit setter comprising an elongated rigid horizontal base plate constituting a foot piece, said foot piece being capable of being positioned flatwise atop a stationary horizontal support surface and held firmly against said surface by the user's foot, a vertically elongated tubular cylinder of uniform transverse cross-section from end to end and having a lower end affixed atop an end portion of said base plate and disposed at right angles to and rising perpendicularly above the plane of said base plate, a rod of smooth-surfaced uniform cross-section slidingly but non-rotatably mounted in the bore of said cylinder, said rod being of a length appreciably greater than the height of said cylinder, said cylinder having a vertically elongated keying slot in one side, said slot having closed ends terminating short of the respective upper and lower ends of said cylinder, a first rigid L-shaped hook having a shank at right angles to and rigidly joined to a peripheral surface of a lower end portion of said rod and radiating from said rod and projecting outwardly through and retentively but slidingly keyed in said slot and having an outer projecting bill portion directed upwardly and aligned with said slot, and a second L-shaped hook like said first hook and having a shank fixed on a peripheral surface of said cylinder in line with said slot and toward and from which said first hook is reciprocable at will, said rod being rigid and T-shaped, of one piece construction and having an integral crosshead on its upper end, said crosshead providing a gripping and operating handle by way of which the rod is controllably actuated, said hooks being identical in construction and oriented and interrelated with each other, said slot, and said cylinder to achieve coordinate alignment and capable of being readily hitched to the aforementioned eyes on said spring-biased arms, and said first-named hook also serving to prevent rotation of said rod in and with respect to said cylinder.

* * * * *